United States Patent
Pillon

(10) Patent No.: US 7,765,016 B2
(45) Date of Patent: Jul. 27, 2010

(54) BRUSH CONTROL SYSTEM AND METHOD ON A WASHING BRUSH INSTALLATION FOR CLEANING VEHICLES

(75) Inventor: Pierangelo Pillon, Brendola (IT)

(73) Assignee: Ceccato S.p.A., Alte Ceccato di Montecchio Maggiore (IT)

( * ) Notice: Subject to any disclaimer, the term of this patent is extended or adjusted under 35 U.S.C. 154(b) by 415 days.

(21) Appl. No.: 11/570,742

(22) PCT Filed: Jun. 13, 2005

(86) PCT No.: PCT/EP2005/006301

§ 371 (c)(1),
(2), (4) Date: Dec. 15, 2006

(87) PCT Pub. No.: WO2005/123472

PCT Pub. Date: Dec. 29, 2005

(65) Prior Publication Data

US 2008/0086238 A1    Apr. 10, 2008

(30) Foreign Application Priority Data

Jun. 16, 2004    (IT)    .......................... MI2004A1207

(51) Int. Cl.
*G05B 15/00*    (2006.01)
*B60S 3/00*    (2006.01)

(52) U.S. Cl. ............................. 700/1; 15/53.1; 15/53.2; 15/53.3

(58) Field of Classification Search .................. 15/53.1, 15/53.2, 53.3; 700/1
See application file for complete search history.

(56) References Cited

U.S. PATENT DOCUMENTS

| | | | | | |
|---|---|---|---|---|---|
| 3,662,417 | A | * | 5/1972 | Fuhring et al. | 15/53.4 |
| 3,662,418 | A | * | 5/1972 | Kamiya | 15/53.2 |
| 3,725,967 | A | * | 4/1973 | Capra | 15/53.2 |
| 3,797,059 | A | * | 3/1974 | Smith | 15/53.3 |
| 3,818,530 | A | * | 6/1974 | Takeuchi | 15/53.3 |
| 3,823,356 | A | * | 7/1974 | Paavola et al. | 318/39 |
| 3,867,735 | A | * | 2/1975 | Takeuchi | 15/53.3 |
| 4,495,667 | A | * | 1/1985 | Roncaglione et al. | 15/53.2 |
| 4,689,749 | A | * | 8/1987 | Glogowski | 700/230 |
| 4,691,401 | A | * | 9/1987 | Machin | 15/53.2 |

(Continued)

FOREIGN PATENT DOCUMENTS

EP    0 391 877 A    10/1990

(Continued)

OTHER PUBLICATIONS

Wikipedia's definition of "Electric Motor"; 14 pages; Printed on Mar. 4, 2009.*

(Continued)

*Primary Examiner*—Ronald D Hartman, Jr.
(74) *Attorney, Agent, or Firm*—Alston & Bird LLP

(57) ABSTRACT

The brush control system in a washing brush installation for vehicles comprises a first means (5) of control of the rotation speed and torque of a first actuation motor (2) for the rotation of at least one brush (1) of said installation, directly or indirectly connected with a second means (6) of control of the brush position in relation to the vehicle to be washed.

8 Claims, 1 Drawing Sheet

U.S. PATENT DOCUMENTS

Figure 1:
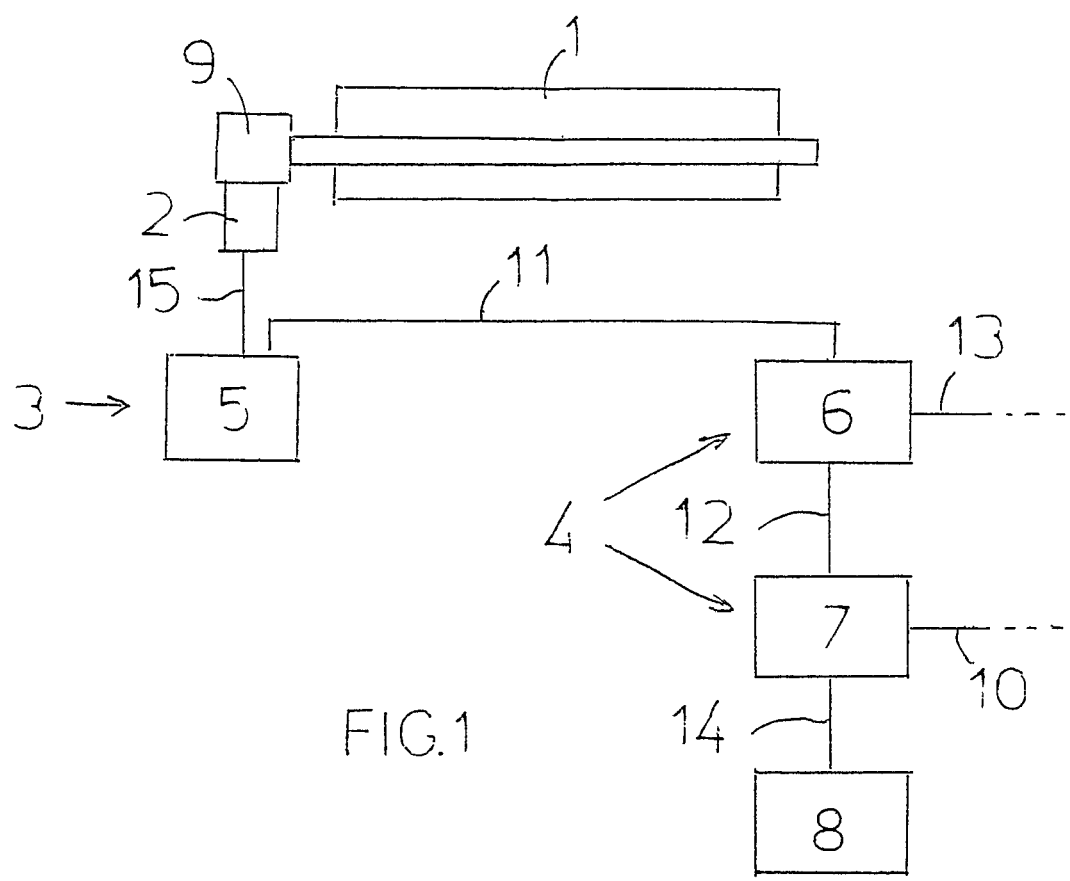

| | | | |
|---|---|---|---|
| 4,754,515 A * | 7/1988 | Ennis et al. | 15/53.3 |
| 5,093,951 A * | 3/1992 | Smith et al. | 15/53.2 |
| 5,901,398 A * | 5/1999 | Ishikawa et al. | 15/53.3 |
| 6,264,754 B1 * | 7/2001 | Bowman | 134/6 |
| 7,219,385 B1 * | 5/2007 | Rietsch, Jr. | 15/97.3 |
| 2007/0151054 A1 * | 7/2007 | MacNeil | 15/53.2 |

FOREIGN PATENT DOCUMENTS

| | | | |
|---|---|---|---|
| EP | 1 074 443 A | 2/2001 | |
| JP | 11 091514 A | 4/1999 | |
| JP | 2001 270427 A | 10/2001 | |
| JP | 2002 178890 A | 6/2006 | |

OTHER PUBLICATIONS

Wikipedia's definition of "Induction Motor"; 6 pages; Printed on Mar. 5, 2009.*

* cited by examiner

BRUSH CONTROL SYSTEM AND METHOD ON A WASHING BRUSH INSTALLATION FOR CLEANING VEHICLES

The present invention refers to a system and a control method for brushes on a washing brush installation for vehicles.

In a washing brush installation for vehicles a problem exists for accurate detection of the contour of the vehicle during the washing stage by the brushes, while controlling at the same time, the pressure at which the washing operations are performed.

As is known, a solution traditionally adopted consists in detecting the angle of the brush and consequently arresting the installation gantry, moving the brush in such a manner that it rises over the obstacle it encounters.

A different solution, commonly used, consists in reading the variation in an electric quantity of the motor that actuates the brush, for example the power absorption, and in defining a threshold in the variation of this electric quantity, so that when it has been exceeded the installation gantry will be arrested, and as before, the brush will be moved in a manner to enable it to rise over the obstacle encountered.

Therefore known solutions present systems based on the disengagement of the brush exclusively by means of moving it away from the surface of the vehicle being washed.

With these systems, the brush rotates at a pre-established fixed speed and the rotation torque is the nominal torque for the electric motor actuating the brush.

Such traditional control systems provide acceptable results in relation to the cleaning action on the surface to be washed, however they do not resolve the problem of the possibility that the vehicle being washed can be subject to damage caused by the entanglement of the brushes in antennas, rear vision mirrors, or other parts of the vehicle.

The technical task proposed in the present invention is therefore to realise a system and a brush control method in a washing brush installation for vehicles that allows to eliminate the technical problems that exist in known art.

In the context of this technical task, one object of the invention is that of realising a brush control system and method in a washing brush installation for vehicles that provides excellent washing performance.

Another object of the invention is to realise a brush control system and method in a washing brush installation for vehicles that, as well as providing excellent washing performance, will eliminate all danger of brushes damaging the vehicle being washed.

The technical task, as well as this and other objects, according to the present invention are achieved by realising a brush control system in a washing brush installation for vehicles, characterised in that it comprises a first means of control of the rotation speed and torque of a first actuation motor for the rotation of at least one brush on said installation, directly or indirectly connected with a second means of control of the position of said at least one brush in relation to the vehicle to be washed.

The present invention also refers to a method for brush control in a washing brush installation for vehicles, characterised in that it reduces the rotation speed and torque of the electric actuation motor of the rotation of at least one brush on said installation when the true current of electric quantity of said electric motor is higher than or equal to at least one reference value.

Other characteristics of the present invention are also defined in the following claims.

Further characteristics and advantages of the invention will be made clearer by the description of a preferred but not exclusive embodiment of the system for brush control on a washing brush installation for vehicles according to the finding, illustrated as an example but by no means in a limiting manner in the single appended drawing, wherein:

FIG. 1 shows a block diagram of the system and method for the brush control on a washing brush installation for vehicles, according to a preferred embodiment of the finding.

With reference to the above FIGURE a brush control system on a washing brush installation for vehicles is schematically shown.

The washing installation can be either of the mobile gantry type or vehicle traction type, and presents one or more pairs of vertical brushes activated using an opening and closing action, and at least one horizontal brush activated using a rise and descent action.

For simplicity, the drawing refers to the control of a brush identified by the numeral 1, on condition that it is clearly understood that the control system operates preferably on all brushes on the installation.

Brush 1 is activated to rotate by a first electric motor 2, in particular, of a triple phase asynchronous type.

The mechanical transmission of the rotating action between the first electric motor 2 and the brush 1 preferably comprises a reducer 9 of the worm/crown gear type.

If brush 1 is horizontal, as illustrated, the relative travel between brush 1 and the vehicle being washed is realised by means of a second electric motor (not shown) that controls the rise and descent of brush 1 and/or by means of a third electric motor (not shown) that controls the translation of the gantry or the traction of the vehicle.

On the other hand, if brush 1 is vertical, the relative travel between brush 1 and the vehicle being washed is realised by means of a second electric motor that controls the opening and closing action of brush 1 and/or again by means of a third electric motor that controls the translation of the gantry or the traction of the vehicle.

The system comprises a first means of control 3 of the rotation speed and torque of motor 2 that activates the rotation of brush 1, directly or indirectly connected with a second means of control 4 that establishes the position of brush 1 in relation to the vehicle being washed.

The first means of control 3 therefore control the first electric motor 2.

These means determine the variation between the true level of the current and at least one reference value of an electric quantity of the first electric motor 2, and control the reduction of the rotation speed and torque performed when the true current level is greater than or equal to the reference value.

The electric quantity in question could be for example, the amount of power absorbed by the first electric motor 2.

In one embodiment, a single maximum reference value of the electric quantity is foreseen.

In a different embodiment a maximum reference value and a plurality of intermediate reference values of the electric quantity are foreseen.

In any case, in order to adjust the settings on the control system, each reference value of the electric quantity is related to the true value of the electric quantity detected during a dry run each time the brush 1 is started up.

In particular, the adjustment setting of the control system determines the output torque by the first electric motor that is sufficient to activate the brush rotation during the dry run.

The second means of control 4 control the second electric motor and/or the third electric motor.

These control the outward motion of brush 1 away from the contour of the vehicle being washed when the true value of the electric quantity is greater than or equal to the reference value.

Advantageously the first control means 3 comprise a first inverter 5 that controls the first electric motor 2 through a connecting line 15, while the second control means 4, comprises a second inverter 6 that controls the second electric motor through a connecting line 13, and a third inverter 7 that controls the third electric motor through a connecting line 10.

In one embodiment, all inverters, the first, the second, and the third, function in vectorial mode.

In another embodiment, if brush 1 is horizontal, only the first inverter and the second inverter function in vectorial mode, whereas, if brush 1 is vertical, only the first inverter functions in vectorial mode.

Each vectorial inverter can be of the closed loop type, and can operate in vectorial mode with the rotation speed sensor of the corresponding electric motor, or it can be of open loop type and operate in simulated vectorial mode.

The first control means 3, and the second control means 4, as well as being connected to each other through connecting lines 11 and 12, are in turn connected to a programmable logic controller 8 through a connecting line 14.

The programmable logic controller 8 naturally ensures the supervision of the control system.

The maximum reference value of the electric quantity is set in the first inverter, while the intermediate reference values of electric quantity, if present, are preferably set in the programmable logic controller 8.

In short, the control system functions as follows:

We will suppose that only one single maximum reference value of electric quantity has been established, in particular, the maximum reference value of the power absorption of the first electric motor.

In this situation, control is limited to one single function status of the first motor, but to compensate, the reaction delay is also limited because of the control system intervention that concerns only that particular function status.

At installation start-up the control system setting is adjusted as described above.

During the washing action, when the resisting torque acting on brush 1 increases because of the presence of some obstacle, for example, in the case where its bristles become entangled in some element of the vehicle such as antennas, rear vision mirrors, tow hooks or similar elements, the first electric motor 2 begins to slow down and to increase the power absorption until eventually, if the presence of the obstacle persists, to reach or to exceed the maximum reference value.

When the first inverter determines a power absorption of the first electric motor 2 that is greater than or equal to the maximum reference value, it adjusts the output torque reducing it until it eventually provokes the arrest of brush 1.

In the same manner when the maximum reference value is reached or exceeded this signal is sent to the second and/or third inverter, directly or indirectly through the programmable logic controller 8 with which the first inverter is connected.

Consequently, the second and/or third inverter activate the second and/or third electric motor in such a manner that brush 1 is moved away from the contour of the vehicle being washed until, after the element that is blocking the rotation of brush 1 is removed, a new balance is established between the torque and the rotation speed of the first motor 2 under the maximum reference value for the absorbed power.

In cases where, as well as the maximum reference value, intermediate reference values have also been set for the absorbed power, the control is extended to several levels of function status of the first electric motor, but there is an increase in the control system reaction delay.

In a preferred embodiment, when the maximum reference value for power absorption is reached or exceeded, the torque and the rotation speed of the first electric motor is adjusted, and simultaneously, the brush is commanded to move away from the vehicle contour, whereas when any of the intermediate reference values for power absorption are reached or exceeded, the command is limited to moving the brush away from the vehicle.

The brush control system on a washing brush installation for vehicles conceived in this manner can be subjected to numerous modifications and variants, all of which remain within the context of the inventive concept; moreover all components can be replaced by technically equivalent elements.

The invention claimed is:

1. A brush control system in a washing brush installation for vehicles comprising a first means of control of the rotation speed and torque of a first actuation motor for the rotation of at least one brush of said installation, directly or indirectly connected with a second means of control of the position of said at least one brush in relation to a vehicle to be washed, wherein said first control means determines the variation between a true current value and at least one reference value of an electrical quantity of said first motor, and commands the reduction of the rotation speed and torque of said first motor when said true value is greater than or equal to said reference value, and wherein said system sets a single maximum reference value of said electrical quantity.

2. The brush control system of claim 1 wherein said first control means comprises a first inverter and said maximum reference value is set in said first inverter.

3. A brush control system in a washing brush installation for vehicles comprising a first means of control of the rotation speed and torque of a first actuation motor for the rotation of at least one brush of said installation, directly or indirectly connected with a second means of control of the position of said at least one brush in relation to a vehicle to be washed, wherein said first control means determines the variation between a true current value and at least one reference value of an electrical quantity of said first motor, and commands the reduction of the rotation speed and torque of said first motor when said true value is greater than or equal to said reference value, and wherein said system sets a maximum reference value and a plurality of intermediate reference values of said electrical quantity.

4. The brush control system of claim 3 wherein said intermediate reference values are set in a programmable logic controller.

5. A brush control system in a washing brush installation for vehicles comprising a first means of control of the rotation speed and torque of a first actuation motor for the rotation of at least one brush of said installation, directly or indirectly connected with a second means of control of the position of said at least one brush in relation to a vehicle to be washed, wherein said first control means determines the variation between a true current value and at least one reference value of an electrical quantity of said first motor, and commands the reduction of the rotation speed and torque of said first motor when said true value is greater than or equal to said reference value, and wherein the determination of said reference value of said electrical quantity refers to the true value detected during a dry run at each start-up of said at least one brush.

6. A brush control system in a washing brush installation for vehicles comprising a first means of control of the rotation speed and torque of a first actuation motor for the rotation of at least one brush of said installation, directly or indirectly connected with a second means of control of the position of said at least one brush in relation to a vehicle to be washed, wherein one or more of said first control means and said second control means includes a vectorial inverter.

7. The brush control system of claim 6 wherein said first control means includes a first vectorial inverter and at least said first vectorial inverter is a closed loop vectorial inverter.

8. The brush control system of claim 6 wherein said first control means includes a first vectorial inverter and at least said first vectorial inverter is an open loop vectorial inverter and operates in simulated vectorial mode.

\* \* \* \* \*